June 4, 1968 A. LIPPERT 3,386,182
METHOD OF AND APPARATUS FOR THE MIXING, DRYING OR MOISTENING
BY PNEUMATIC MEANS OF MATERIAL IN POWDER FORM
Filed Sept. 13, 1966 3 Sheets-Sheet 3

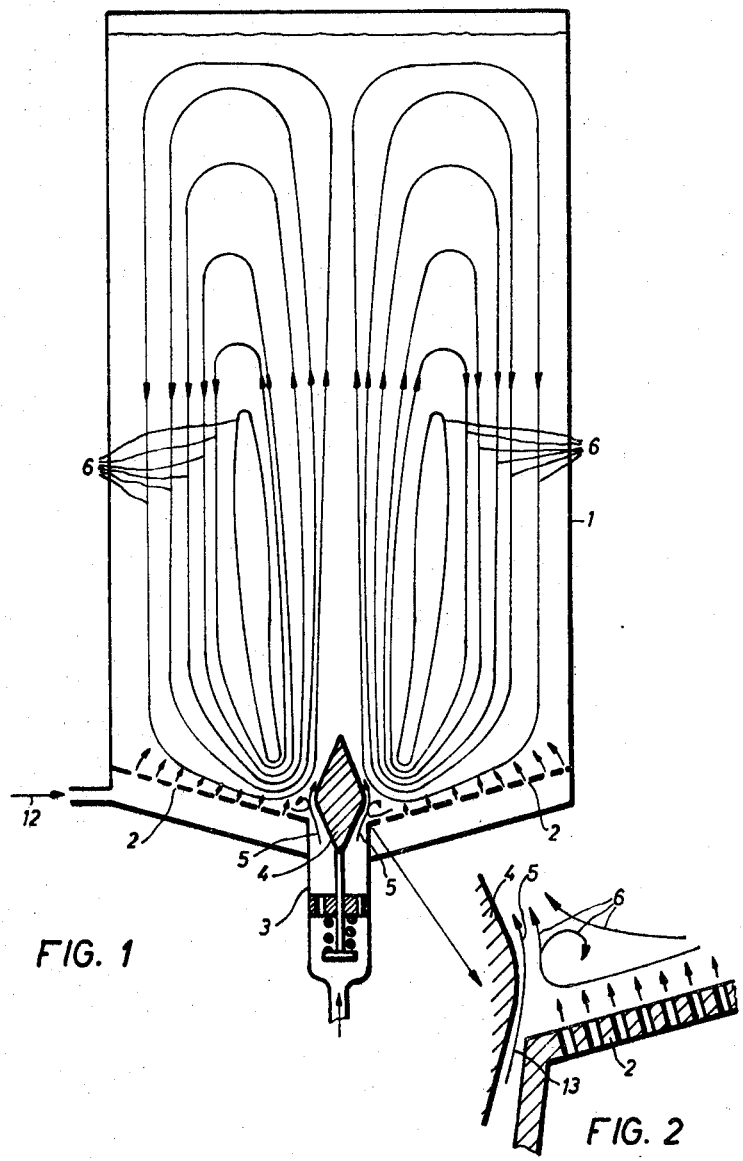

INVENTOR.
AXEL LIPPERT
BY
ATTORNEYS

United States Patent Office 3,386,182
Patented June 4, 1968

3,386,182
METHOD OF AND APPARATUS FOR THE MIXING, DRYING OR MOISTENING BY PNEUMATIC MEANS OF MATERIAL IN POWDER FORM
Axel Lippert, Krefeld-Bockum, Germany, assignor to Farbenfabriken Bayer Aktiengesellschaft, Leverkusen, Germany, a corporation of Germany
Filed Sept. 13, 1966, Ser. No. 579,052
Claims priority, application Germany, Sept. 18, 1965, F 47,240
8 Claims. (Cl. 34—10)

ABSTRACT OF THE DISCLOSURE

Mixing, drying or wetting of pulverulent or granular particle material by fluidized bed operation using fluidizing gas jets and at least one propellant gas jet continuously injected in unidirectional flow with the fluidizing gas jets but at a substantially higher velocity to produce regular and uniform circulation of the bed material and intensive mixing thereof under the influence of the inherent shearing forces produced, and a fluidizing chamber for carrying out the foregoing which has a propellant gas jet supply conduit opening into the chamber bottom and containing at the opening a spring-loaded check valve.

This invention relates to a method of mixing, drying or moistening by pneumatic means, material in powder form, in which the material is fluidised on an aeration plate, and to apparatus for carrying this method into effect.

Mixing methods are known in which the material resting in the mixing chamber is fluidised by means of strong intermittent air impulses, which are blown through nozzles into the loose material. It is necessary to blow intermittently, since otherwise a channel would form through the bed of loose material above the nozzle and the injected air would discharge through the channel without moving the material.

The nozzle systems, e.g. Laval nozzle rings, the openings of which face the bed of loose material, must be protected with sintered metal inserts against material which flows back. In order to achieve an intermittent and pulse-like fluidizing of the entire bed of loose material, it is always necessary to inject large quantities of air at a high pressure.

It is known for the nozzle rings to be arranged in the mixing container so that the direction of discharge extends outwardly, tangentially and obliquely of the container axis. In this way, the material is forced upwardly onto the container wall with each air impulse and falls back into the middle of the container space. When the pulse sequence is too short, a demixing occurs by a cyclone effect, the coarse particles migrating to the wall of the container and the fine particles to the centre of the container.

Mixers having porous bottom plates are also known, in which the material situated on the porous plate is circulated by differential plate aeration.

The plate is usually subdivided into sections which are separately aerated. The circulating movement of the material in the fluidised bed is irregular but causes a relatively good coarse mixing by frequent repetition. A fine mixing is not obtained because the fluidisation is insufficient to supply the shearing forces necessary for breaking up the agglomerates. Another disadvantage in this connection is the necessarily high gas and air throughput and thus the difficult cleansing of the waste air and the uneconomical energy consumption.

It has now been found that a fine mixing of pulverulent material in a fluidised bed is produced at economic cost if at least one propellant jet of air or gas is continuously blown, in the same direction as the bottom aeration jets but at a substantially higher velocity, into the material which is in a fluidised state. The propellent jet is advantageously injected with at least the speed of sound. By this means, the irregular movement of the particles, which is characteristic of the fluidised bed, is converted into a regular and uniform circulation movement, a zone of strong shearing forces being produced in the vicinity of the point of injection of the propellant jet, in which agglomerates are broken up and a particularly intensive mixing of the material is produced. The strength of the mixing turbulence decreases in proportion to an increase in the distance from the point of injection of the propellant jet in the fluidised bed. The member for injecting the propellant jet is constructed as a spring-loaded check valve arranged in the aeration base, the valve member thereof being designed in such a way that, with aeration of the valve, the flow of the propellant jet is spread out over the largest possible area of the valve member and is then collected into a central upward stream.

For this purpose, the valve member is constructed as a double cone with cone apices pointing in opposite directions, the valve member being rounded off at its largest diameter. The valve member may also be constructed as a sphere or as a prismatic bar for a slit-like valve opening. A guide ring is preferably arranged on that side of the valve member which faces the fluidised bed for the purpose of guiding the stream of solid material.

In order to be able to effect a wetting of the dust with liquids, liquid supply pipes are provided wihich open in the immediate vicinity of the valve seat into the throughflow gap of the propellant jet.

Constructional examples of arrangements which serve to carry the method into effect are shown diagrammatically in the drawings.

FIGURE 1 is a flow diagram of the material in a fluidised bed container provided with a perforated bottom plate and having a propellant jet valve fitted therein in the aerating position thereof.

FIGURE 2 is a view on a larger scale of the gap between the lifted valve member and the valve ring and shows the flow lines of the propellant jet and the fluidised material.

Figure 3:
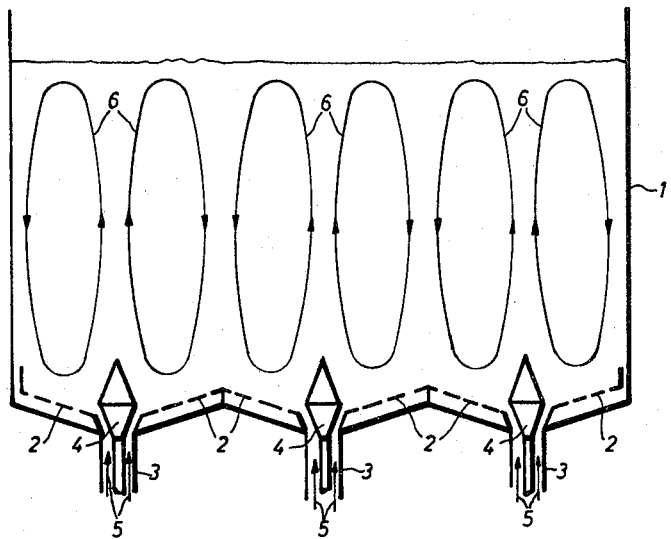
FIGURE 3 illustrates a fluidised bed container with three injecting members for the propellant jet.
Figure 4:
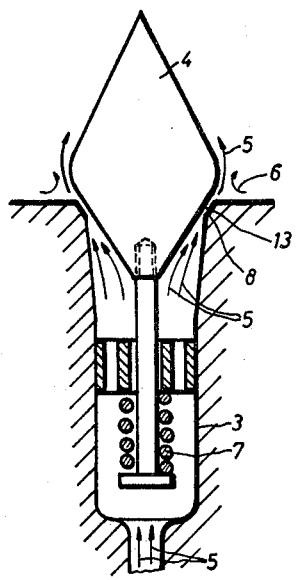
FIGURE 4 shows an injection member for the fluidised jet, this member being constructed as a check valve.

According to FIGURES 1 and 3, the container is provided with one or more perforated bottom plates 2 and one or more supply pipes 3 for the propellant jet, these pipes opening upwardly into the fluidised bed. Each supply pipe 3 is adapted to be closed by a check valve 4. The check valves are shown in the open position. The reference 12 in FIGURE 1 designates the air connection for the bottom plate aeration to fluidise the material situated on the plate 2. The circulating flow of the fluidised material assumes similarly shaped paths with the introduction of the propellant jet into the fluidised bed and this flow is indicated by the lines 6. In order to avoid zones where the mixing is less satisfactory, the aeration bottom plate 2 is slightly inclined in the direction towards the supply pipe 3. The propellant jet 5 entering at high velocity, for example, with a velocity equal at least to the speed of sound, through the gap 13 (FIGURE 2) and into the material which is in a fluidised state in the container, flows around the wall of concave curvature of the valve member 4 and is brought back again to the apex of the valve member 4 under the influence of the boundary layer effect. Immediately above the gap 13, the propellant jet 5 produces a rapid fluidising motion of the fluidised material. The propellant jet combined again at the apex of the valve member 4 is sufficiently powerful to attract by suction, and to accelerate, the solid material which surrounds it. As a result, the jet is gradually widened and imparts its total impulse to the solid material surrounding it, which is thus carried to the surface of the fluidised bed. At the same time, the solid material in the region furthest from the propellant jet travels downwardly, is taken up again at the bottom by the jet continuously introduced into the fluidised bed and carried upwardly, etc., as represented by the flow lines 6 (FIGURE 1). As regards the check valve of FIGURE 4, the valve cone 4 can only free the annular gap at a selected initial pressure, determined by the pressure of a spring 7 against its valve ring 8. The initial pressure due to spring tension and the corresponding discharge velocities set up immediately upon the lifting of the cone 4 must be sufficiently high for the material which is in a fluidised state to be unable to settle in the gap.

Figure 5:
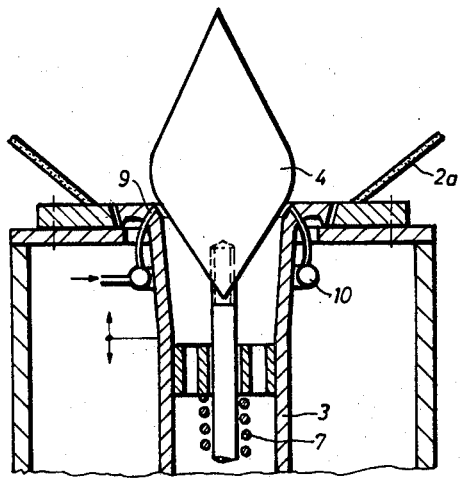
FIGURE 5 shows an inlet valve for the propellant jet with liquid supply pipes in the valve seat.

In order to make possible a convenient extraction of the prepared or treated product after stopping the operation, the entire check valve 4, together with the supply pipe 3, is arranged to be displaceable axially in the bottom plate 2a, as shown in FIGURE 5. In the case in which the powder is to be wetted with liquid substances, liquid supply pipes 9 are provided, these being supplied through an annular duct 10 and discharging at the valve seat.

Figure 6:
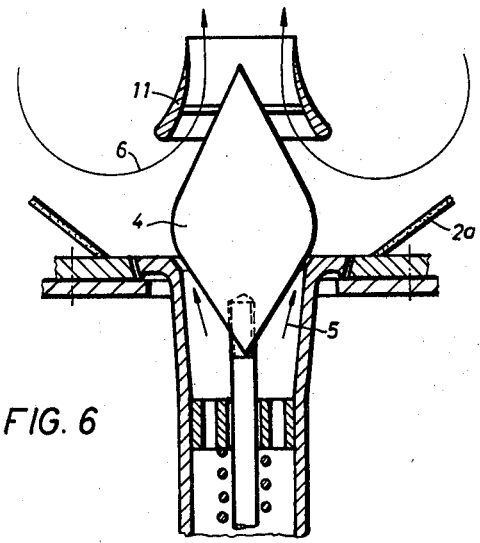
FIGURE 6 shows an inlet valve for the propellant jet with a guide ring for the fluidised material arranged on the valve member.

FIGURE 6 shows a guide ring 11 which serves to guide the stream of solid material 6 and which is fixed on the head of the valve member 4. The sintered or perforated bottom plate of the container (not shown) is indicated at 2a.

The continuous, thin propellant jet producing a high mixing action, even having regard to the necessary fluidised bed air quantity, requires a substantially smaller throughput of air than air jets which have to whirl or to fluidise intermittently the powder resting on the bottom plate. By comparison with the intermittent working method involving a strong formation of dust clouds and highly stressed waste air cleansing systems, it is advantageous to have a substantially smaller dust cloud formation, allowing the use of simple dust separators which are not so highly stressed.

The mixing procedure according to the invention is also suitable for solving problems regarding heat and materials exchange. Due to the nozzle stream within the fluidised bed, a compulsory and considerably more stable fluidised bed is produced. The circulatory movement produces a natural characteristic of the heat and materials exchange with a high efficiency. In particular, the heterogeneous catalysis is controlled in an advantageous manner by this system. The nozzle stream acts in the manner of a "stable flame," whose reaction components are constantly replenished at the "flame rim" by the circulatory motion. The otherwise usual difficulties arising in the fluidised bed due to irregularities in the movement of the solid material and substance are overcome. The heat transfer on the solid body is simpler, since, as a result of the circulatory movement, the heat transfer factors are independent of the orientation of the solid body in the fluidised bed; this is of particular interest to industries concerned with heat treatment.

Using this system, the wetting of the dust, for example, with fats or other media, can be carried out in a highly advantageous manner by injecting the liquid into the gas stream of higher velocity just above the gap formed between the lifted valve member and the valve ring. The jet is broken up and immediately distributed in a finely divided form onto the particles which are in a fluidised state.

I claim:

1. Method of carrying out controlled flow path fluidized bed operations which comprises fluidizing fluidizable particle material in a fluidization zone by passing a plurality of fluidizing jets of fluidizing gas distributed substantially along the flow cross-section of said zone upwardly through said zone at fluidizing velocity and into fluidizing contact with said material while continuously injecting at an axial point at least one propellant jet of gas into said zone in a unidirectional flow with said fluidizing jets and axially concentric thereto but at a substantially higher velocity than said fluidizing jets to produce a central upward flow of said particles and a circulating peripheral downward flow thereof substantially back to said axial point for regular and uniform circulation movement of said material and intensive mixing thereof under the influence of inherent shearing forces produced.

2. Method according to claim 1 wherein said propellant is introduced as an annular jet which converges to said axial point and said propellant jet is injected at a velocity corresponding substantially to at least the speed of sound.

3. Apparatus for carrying out the method according to claim 1, which comprises a fluidizing chamber provided with a perforated bottom plate having perforations distributed substantially along the flow cross-section of said chamber for introducing a plurality of fluidizing jets of fluidizing gas upwardly therethrough into said chamber, a separate propellant gas inlet conduit opening into said bottom plate and defining a valve seat thereat, and a resiliently biased check valve body operatively arranged in said conduit in displaceable sealing contact with said valve seat via normally closing resilient biasing means disposed thereat.

4. Apparatus according to claim 3 wherein said valve body is in the form of a double cone having its apices pointing in opposite axial directions and having the common widest diameter thereof at the corresponding cone base portions rounded off, said body being displaceable in said axial direction and said direction coinciding substantially with the axis of said chamber.

5. Apparatus according to claim 4 wherein a guide ring is disposed at and in spaced concentric relation to the apex portion of said valve body upwardly facing said chamber.

6. Apparatus according to claim 3 wherein liquid supply pipes are concentrically arranged in the immediate vicinity of said valve seat and open into the gas through-flow gap defined between said valve seat and the valve body.

7. Apparatus according to claim 3 wherein said valve body is in the form of a sphere.

8. Apparatus according to claim 3 wherein said valve body is in the form of a prismatic bar and said valve seat is in the form of a cooperating slit-like valve opening.

References Cited

UNITED STATES PATENTS

| | | | |
|---|---|---|---|
| 3,159,383 | 12/1964 | Munster | 259—4 |
| 3,241,520 | 3/1966 | Wurster et al. | 118—303 |
| 3,253,944 | 5/1966 | Wurster | 118—303 XR |

FREDERICK L. MATTESON, JR., *Primary Examiner.*

A. D. HERRMANN, *Assistant Examiner.*